United States Patent [19]

Maeda et al.

[11] Patent Number: 5,407,990
[45] Date of Patent: Apr. 18, 1995

[54] COMPOSITION AND METHOD FOR FORMING INSULATING FILMS ON ELECTRICAL STEEL SHEETS

[75] Inventors: Yasuharu Maeda; Akira Sakakura; Kenichi Masuhara, all of Chiba; Koji Tanaka, Okayama, all of Japan

[73] Assignees: Nisshin Steel Co., Ltd., Tokyo; Toyobo Co., Ltd., Osaka, both of Japan

[21] Appl. No.: 663,959

[22] PCT Filed: Aug. 13, 1990

[86] PCT No.: PCT/JP90/01029

§ 371 Date: Mar. 20, 1991

§ 102(e) Date: Mar. 20, 1991

[87] PCT Pub. No.: WO91/02828

PCT Pub. Date: Mar. 7, 1991

[30] Foreign Application Priority Data

Aug. 14, 1989 [JP] Japan ................................. 1-207872
Nov. 24, 1989 [JP] Japan ................................. 1-303159

[51] Int. Cl.[6] .............................................. C08K 3/10
[52] U.S. Cl. .................................... 524/407; 524/406; 427/58; 427/388.2
[58] Field of Search ................... 524/407, 406; 427/58, 427/388.2

[56] References Cited

U.S. PATENT DOCUMENTS

| | | | |
|---|---|---|---|
| 3,793,073 | 2/1974 | Kitayama et al. | 428/141 |
| 4,032,675 | 6/1977 | Irie et al. | 427/126 |
| 4,170,671 | 10/1979 | Hirasawa et al. | 427/388 C |
| 4,618,377 | 10/1986 | Nakamura et al. | 148/251 |
| 4,671,825 | 6/1987 | Ishii et al. | 148/6.15 R |
| 4,830,877 | 5/1989 | Katayama et al. | 427/127 |
| 4,844,753 | 7/1989 | Katayama et al. | 148/251 |

FOREIGN PATENT DOCUMENTS

| | | |
|---|---|---|
| 77048586 | 12/1977 | Japan . |
| 80003429 | 1/1980 | Japan . |
| 59-085872 | 5/1984 | Japan . |

*Primary Examiner*—Paul R. Michl
*Assistant Examiner*—John J. Guarriello
*Attorney, Agent, or Firm*—Keck, Mahin & Cate

[57] ABSTRACT

A composition for forming insulating films on electrical steel sheets includes a (meth)acrylate ester polymer, modified into a polymer containing an ethylenic unsaturated carboxylic acid component as an essential copolymerizable component, optionally with other copolymerizable vinylic compound components. The composition is used in the form of an aqueous emulsion with or without methacrylate ester base polymer powders. The composition has low expandability and coatability and provides an improved film. Especially when the composition contains methacrylate ester base polymer powders, improved weldability is achieved and high-quality coated steel sheet products are provided. A method of forming the insulating films is also described.

8 Claims, No Drawings

COMPOSITION AND METHOD FOR FORMING INSULATING FILMS ON ELECTRICAL STEEL SHEETS

TECHNICAL FIELD

The present invention relates to a composition for forming insulating films of improved insulating performance on electrical steel sheets, with which an insulating film excelling not only in insulating performance and weldability but also in such film properties as water resistance, adhesion, punchability and corrosion resistance can be coated and formed on the electrical steel sheets without substantial expansion, and is concerned with a method for forming insulating films on electrical steel sheets with said composition.

BACKGROUND TECHNIQUE

So far, numerous techniques have been disclosed about how to form insulating films on the surfaces of electrical steel steers and compositions for providing such insulating films. Long-established techniques make use of insulating film-forming compositions consisting as the main component of chromates and/or phosphates to form inorganic films. A problem with the inorganic films made of such inorganic materials is that although they excel in heat resistance, yet they are inferior in their water resistance, punchability and adhesion to steel sheets during processing.

Recently, according to techniques attempted in many cases to solve such a problem, a film-forming composition containing a mixture of a film forming-inorganic element such as chromate or phosphate etc. (hereinafter sometimes called the inorganic component) with a film forming-organic resin (hereinafter sometimes referred to as the organic component or simply the resin; said resin being usually a synthetic resin which may hereinafter be also called the "polymer") is applied to an electrical steel sheet to form on it a combined inorganic/organic film (hereinafter often sometimes called the semi-organic film). This semi-organic film is to take full advantage of both the properties of the inorganic film that it excels in weldability and heat resistance and the properties of the organic film that it excels in water resistance, insulating performance, punchability and adhesion. A composition for forming the semi-organic film is generally obtained in the form of a mixture (hereinafter sometimes called the inorganic component-containing mixed emulsion or simply referred to as the mixed emulsion) of an aqueous solution (often used with a view to a working environment and fire prevention) of an inorganic component with an aqueous polymer emulsion in which an organic component is dispersed. However, the technique for forming the semi-organic film of the inorganic component-containing mixed emulsion suffers from various disadvantages. The first disadvantage is a short pot life due to the emulsification and dispersion of the resin (polymer) in the mixed emulsion which are unstable. The second disadvantage is that because the mixed emulsion contains an emulsifier or dispersant used to emulsify and disperse the resin (polymer), foams come to be observed on the resulting film by various coating operations such as stirring etc. to give rise to pinholes in crater-forms or bubble-like defects on the film. This makes the formed film poor in corrosion resistance and insulating performance. The third disadvantage is that when electrical steel sheets with films formed on them are punched out followed by lamination and welding, the organic component decomposes to emit gases and give rise to blow-holes in a beaded region, resulting in a serious degradation of weldability.

Action taken against the second disadvantage will now be explained. In order to reduce as much as possible the expansion of the mixed emulsion to a minimum, a defoamer is generally incorporated in the aqueous polymer emulsion that is one preparatory material for the mixed emulsion. However, this defoamer is likely to lose its effect gradually during the storage of the aqueous polymer solution to which the defoamer was added. Especially when it freezes in a cold district during the winter season, it loses its substantial defoaming effect upon thawing. This then causes the mixed emulsion to foam during preparation or when applied to steel plates, giving rise to various difficulties. Another problem with the mixed emulsion is that it is poor in freeze-thaw stability (the dispersion stability of the aqueous polymer emulsion frozen during storage—an index to whether or not it maintains the prior-to-freeze dispersion state after thawing) or it undergoes a drop-with-time of dispersion stability. Such problems have yet to be solved to satisfaction.

In order to eliminate the aforesaid disadvantages relating to pot life, foaming and weldability, the inventors have proposed to use as the organic component a combination of an acryl base resin and/or an acryl/styrene base resin with an acrylonitrile base resin, as set forth in Japanese Patent Laid-Open No. 62-100561.

However, it has now been found that in post-treatments following the formation of insulating films on the surfaces of steel sheets (e.g. annealing which is carried out to rid the steel sheets of deformation caused by punching them into the desired shape and which, by way of example, is performed at 815° C. for 1 hour in a gaseous mixture of 5% $H_2$ with the balance of $N_2$), the acrylonitrile base resin decomposes thermally into CO, $CH_4$ and other gases, which in turn cause an increase in the amount of C in the steel sheets or, to put it another way, give rise to the so-called "carburizing". This carburizing or the increase in the amount of C in the steel sheets deteriorates their magnetic properties severely, thus leading to another problem.

With current tendencies toward making the performance of electrical steel sheet products higher, insulating films for them are increasingly required not only to be enhanced in terms of General characteristics but also to be greatly improved in terms of specific film characteristics, e.g. weldability and insulating performance in particular. If higher insulating performance are to be imparted to such a conventional semi-organic film in meeting such requirements as referred to above, it is necessary to make insulating films thicker. However, imparting a thickness of, say 2–8 g/m² or more to an insulating film would result in a flow of a larger amount of the composition for forming it; this implies the liklihood of foaming of that composition. Thus, the film forming-composition is required to be less likely to foam. The increase in the thickness of the film, on the other hand, brings about a considerable drop in its weldability. This is because such a thickness increase gives rise to an increase in the amount of resin to be contained in the insulating film. The resin then decomposes by welding heat to emit a large quantity of gases, which render it difficult to form normal welding beads. As means for solving this problem, there is known a technique according to which coarse resin powders are added to an insulating film to impart a roughness of a minute degree onto the film, whereby the gases produced by welding ape dissipated (which is called as space effect) to improve its weldability. However, this technique is far from satisfactory, because at a degree of roughness defining a space factor of about 99% usually demanded in the art, voids to the quantity of gases by decomposition are so small that any sufficient space effect is not attained. As means for solving this, there is known a technique according to which inorganic coarse powders giving no emission of gases are incorporated in an insulating film. Depending upon the type of the inorganic coarse powders incorporated, however, it gives rise to a serious drop in punchability and, due to their inferior resistance to acids and alkalis, it reacts with, e.g. $CrO_3$ in a state of composition, resulting in coagulation or a considerable decrease in the pot life of a composition containing them. Furthermore, the incorporation of such powders in a composition brings about an increase in its thickness and hence a decrease in its adhesion. To improve the weldability of an insulating film, on the contrary, by making it by far thinner, e.g. imparting a thickness of, say, 1 $g/m^2$ or less to it, would reduce its interlaminar resistance (as measured according to JIS C2550)—an index to insulating performance—to a low value of, say, 70–80 $\Omega \cdot cm^2$/sheet, and this would cause a drop in its punchability.

Thus, although, taken altogether, the prior art semiorganic films are more or less improved in terms of insulating film properties, yet the compositions for forming them are still not sufficient in terms of foaming, if higher-performance levels currently required for the product are taken into consideration. Nor are the resulting insulating film properties satisfactory. The conventional compositions has an additional disadvantage of carburizing incidental to the decomposition of resins.

DISCLOSURE OF THE INVENTION

The present invention seeks to eliminate the disadvantages of the prior art wherein the so-called chromate type of surface treating solution containing chromates as a main inorganic component is used as a film-forming composition to form an insulating film on electrical steel sheets and achieve the following advantages; to form an aqueous polymer emulsion which can limit expandability without recourse to a defoamer and so can not be affected by secular change and which is of constant or extremely low expandability even in a frozen state or, in other words, is excellent in freeze stability, to prepare a chromate base surface treating solution with this aqueous polymer emulsion, which is excellent in dispersion stability and provides a film whose water resistance, adhesion and stickiness are superior, to obtain a film which, even when it is as thin as a conventional one, shows sufficient film properties, e.g. insulating performance etc., to obtain a film-forming composition with which a thicker film can be prepared with limited expansion and which is excellent in coatability, to form a film whose properties, e.g. adhesion and punchability etc., are superior, and to obtain a film which can be prevented from being carburized during annealing whether it is thick or thin.

As a result of extensive studies, it has now been found that the above-mentioned difficulties can be solved by the present invention summarized below.

The monomers for obtaining alkyl ester methacrylate and/or alkyl ester acrylate polymers so far used as an organic component blend to prepare a chromate base surface treating solution are polymerized in the presence of an ethylenic unsaturated carboxylic acid as an essential copolymerizable component to obtain such polymers and, optionally, in the presence of other vinylic compound, and at a specifically selected copolymerization ratio range, whereby the resulting polymer is modified such that the minimum filming temperature (that is the minimum temperature at which a transparent continuous film can be formed and may hereinafter be simply abbreviated as MFT) and expandability of its aqueous emulsion lie in specific ranges. According to one specific aspect of this invention, an aqueous polymer emulsion of low expandability in which the thus modified emulsion is dispersed is mixed with an aqueous solution of an inorganic component in a mixed resin solution. According to another specific aspect of this invention, a mixed resin solution obtained by incorporating in the aforesaid aqueous polymer solution of low expandability specific methacrylate ester base polymer powders in place of part of the modified polymer of said aqueous polymer solution is mixed with an aqueous solution of an inorganic component into a mixed emulsion.

The composition and method for forming insulating films on electrical steel sheets will now be explained in greater detail.

The modified polymer used as the whole, or a part thereof, of the organic component of this invention is a carboxylic acid component-containing polymer having a mean particle size of 0.5 $\mu$m or below (this term is used to tell that polymer from other polymers to be described later) containing 56–97% by weight of an alkyl ester methacrylate component and/or an alkyl ester acrylate component, 3–7% by weight of an ethylenic unsaturated carboxylic acid component and 0–37% by weight of vinylic compound other than the above described. In this invention, said aqueous polymer solution of low expandability that is one material for forming the inorganic component-containing mixed emulsion is one in which the carboxylic acid component-containing polymer is stably dispersed in an aqueous medium and which can be formed into a film at a minimum temperature of 40°–70° C. with an expandability of 10 ml or below (it is noted that this aqueous polymer emulsion is obtained only after the monomers are polymerized in an aqueous solution, as hereinafter described).

The ratio of copolymerization (based on the total weight of all the monomers constituting the polymer, as hereinafter follows) of the alkyl ester methacrylate and/or alkyl ester acrylate that are the main components of the carboxylic acid component-containing polymer (the two acid groups of which may hereinafter be called the (meth)acrylic acid) as a whole is 56–97% by weight, preferably 64–86% by weight. If the ratio of copolymerization of the alkyl ester (meth)acrylates is below 56% by weight, then the resulting film will become poor in such film properties as water resistance and adhesion. At higher than 97% by weight, on the other hand, low expandability will not be achievable. The alkyl ester (meth)acrylates are one or two or more selected from alkyl esters of methyl, ethyl, propyl, butyl, phenyl and others of (meth)acrylic acids. In this invention, it is required that the minimum filming temperature (MFT) of the aqueous polymer emulsion at which it can be formed into a film lie in the range of 40°–70° C. for the reasons to be hereinafter described. To achieve such MFT easily, it is preferred that a methyl methacrylate and phenyl methacrylate etc. capable of increasing MFT, especially methyl methacrylate) be copolymerized with an ethyl acrylate, propylacrylate butylacrylate etc. capable of decreasing MFT (especially butyl acrylate) at a weight ratio of 1:0.2 to 0.9 such that the resulting MFT comes within the desired range. A larger ratio of the latter is not desirable, since the resulting film becomes sticky.

In this invention, it is required that the ratio of copolymerization of the ethylenic unsaturated carboxylic acid that is the necessary copolymerizable component of the carboxylic acid component-containing polymer be in the range of 3–7% by weight, preferably 4–6% by weight. If the ratio of copolymerization of this essential component is below 3% by weight, then the aforesaid objects, inter alia, low expandability will be unachievable. Further at higher than 7% by weight, on the other hand, the resulting film will become poor in such properties as water resistance etc. The ethylenic unsaturated carboxylic acids may be ethylenic unsaturated monocarboxylic acid selected from acrylic acid and methacrylic acid, or ethylenic unsaturated dicarboxylic acid selected from itaconic acid, maleic acid and fumaric acid etc.

The ratio of copolymerization of other vinylic compounds may lie in the range of 0–37% by weight. In this invention, such vinylic compounds may not be used as a copolymerizable component, when used however, the ratio of copolymerization is 37% by weight or below. Of these vinylic compounds, preference is given to one or two aromatic vinyl compounds selected from styrene, α-methylstyrene and chlorostyrene have some relation to an increase or decrease in MFT. Preferably, they are copolymerized at a ratio of 10–30 % by weight, more particularly 15–25% by weight. Vinylic compounds other than aromatic vinylic compounds out of the vinylic compounds (sometimes called as non-aromatic vinyl compounds) such as one or more vinylic compounds selected from acrylamide, N-methylolacrylamide, ethylene glycol monomethacrylate and ethylene glycol dimethacrylate may be used in an amount of preferably 5% by weight or below owing to their effect analogous to that of the aromatic vinyl compounds. The aromatic and non-aromatic vinyl compounds (belonging to what is called crosslinkable monomers in polymerization reactions) may be contained and used in combination.

If the objects of this invention are not to be affected unfavourably, small amounts of monomers other than the aforesaid compounds, e.g. those represented by conjugated diene, halogenated vinyl, halogenated vinylidene, ethylenic unsaturated sulfonate (e.g. sodium p-styrene sulfonate and sodium vinyl sulfonate), vinyl ester, e.g. vinyl acetate etc. and acrylonitrile monomers etc., may be used.

The aqueous emulsion of a carboxylic acid component-containing polymer used in this invention should have a mean particle size of 0.5 μm or below for the reason that at a mean particle size exceeding 0.5 μm, the resulting film decreases in such properties as water resistance etc.

In this invention, it is required the MFT of the carboxylic acid component-containing emulsion be regulated to the range of 40°–70° C., preferably 45°–65° C., partly because an MFT less than 40° C. makes the resulting film increase in its stickiness and expandability, and partly because at higher than 70° C., when the monomers polymerizes into a polymer, to coagulation is likely to occur. Use of an emulsifier, etc. so as to avoid such coagulation makes the resulting film increase in its expandability. Thus, considerable difficulty will be encountered in preparing an aqueous emulsion in which low-expandable and fine polymer particles are stably dispersed.

In this invention, the expandability of the carboxylic acid component-containing aqueous polymer emulsion should be regulated to 10 ml or below, because at an expandability exceeding 10 ml, not only is it difficult to prepare a film-forming composition, but there are drops in the corrosion resistance and insulating performance of the resulting film. Here the term expandability is understood to mean an amount of bubbles in volume (ml) after 11 g of an aqueous emulsion sample (having a solid matter content of 50% by weight) has been well-shaken in a 250-ml graduated cylinder together with 100 ml of deionized water, 15 g of chromic anhydride, 5 g of boric acid, 4 g of magnesium oxide and 3 g of glycerin and then permitted to stand for 2 minutes.

It is noted in this context that the concentration of the polymer in the aqueous polymer needs to be limited solution. This is because the dispersion stability of the aqueous polymer emulsion during storage is not appreciably affected unless the concentration is too high or too low. However, this is not the case with extremely increased or decreased concentration. Consequently, the concentration of the polymer in the aqueous polymer emulsion may be determined depending upon the composition of the aqueous inorganic component solution to which it is added, what the resulting preparation is used for, or other factors. Further, the polymer concentration of that emulsion may also be regulated by the addition of water during its preparation. Usually, the polymer concentration of the emulsion may be chosen from the range of 5–65% by weight.

In this invention, no limitation is imposed on how to prepare the above-mentioned carboxylic acid component-containing aqueous polymer emulsion of low expandability. It is desired, however, to use a means of polymerization of a soap-free emulsion in an aqueous medium in which ordinary low-molecular-weight emulsifiers are not used. Referring here to polymerization initiators, it is preferable to use redox catalysts in which ammonium persulfate, potassium persulfate, sodium chlorate, etc. are used as oxidizers and acidic sodium sulfite, sodium sulfite, etc. are used as reducers. The amount of such catalysts used may be in the range of 0.2–2% by weight, preferably 0.3–1.5% by weight based on the total weight of all the monomers. The MFT may be regulated to the selected range by regulating the combination of the alkyl ester (meth)acrylates, while the expandability may be adjusted to the selected range by using mainly a soap-free emulsion. Regulation of the mean particle size to the selected range may also be achieved by vigorously stirring in the polymerization. In this connection, it is noted that the weight ratio of the starting materials expresses immediately the ratio of copolymerization, since the monomers left to be reacted are hardly left at the end of polymerization.

Then, reference will now be made to the methacrylate ester base polymer powders used as the organic component in place of part of the carboxylic acid component-containing polymer according to this invention.

In this invention, the methacrylate ester base polymer used has an MFT of 80° C. or higher, preferably in the range of 100°–150° C. or higher. At an MFT lower than 80° C., it is impossible to obtain a film excelling in such properties as insulating performance, adhesion, corrosion resistance and weldability etc. Referring to the mean particle size of the methacrylate ester base polymer powders, it is understood that according to one of the first aspect of this invention, the methacrylate ester base polymer in fine powders which is used alone has a mean particle size of 0.5 μm or below as a whole. According to another aspect of this invention, the methacrylate ester base polymer in coarse powders having mean particle size of 5~15 μm are used with said fine powders in an amount of 5–90% by weight of the total weight of the methacrylate ester base polymer. It is noted in this connection that the fine powders having a mean particle size of 0.5 μm or below and the coarse powders having a mean particle size of 5–15 μm do not substantially overlap each other in the particle size distribution, since differences between the mean particle sizes are large. According to the latter aspect of this invention, much more improved weldability is attainable owing to the space effect of the coarse powders. The results of studies made by the present inventors have indicated that the mean particle size range of 5–15 μm for the coarse powders satisfy all the requirements relating to the effect of imparting a minute degree of roughness to the surface of the resulting film, coatability (too large a particle size gives rise to striations at the time of coating, leading to coating defects), space effect, space factor and economical considerations.

In this invention, the methacrylate esters used, for instance, may include methyl, isopropyl, t-butyl, phenyl and cyclohexyl esters etc. shown in ester base. Among others, preference is given to methyl methacrylate in view of the objects of this invention to be attained. The methacrylate esters may be copolymerized with other vinylic monomers, provided that an MFT coming within the above-selected range is obtainable. In particular, it is desired to use a crosslinked methacrylate ester base polymer copolymerized with 10% by weight or less, preferably 0.5–7% by weight of crosslinkable monomer such as ethylene glycol dimethacrylate, diethylene glycol dimethacrylate, polyethylene glycol dimethacrylate, divinylbenzene etc. with a view to increasing the heat resistance of the resulting polymer, thereby enhancing the space effect.

The fine powders (having a mean particle size of 0.5 μm or below) of the methacrylate ester base polymer are obtained in the form of an aqueous dispersion which has been polymerized, as will hereinafter be described. Since the fine powders of the methacrylate ester base polymer may be mixed with the aqueous emulsion of the carboxylic acid component-containing polymer with no difficulty at all, the aqueous dispersion obtained by polymerization may be used as such.

In order to produce the aqueous dispersion of the fine powders of the methacrylate ester base polymer in a form having a mean particle size of 0.5 μm or below and in a coagulation-free stable state, it is preferable that the methacrylate ester base monomer be polymerized with a water-soluble catalyst in an aqueous medium of pH 4 or below and in the presence of a water-soluble polymer in which a monomer unit consisting substantially of methacrylic acid or its salt is combined with a monomer unit comprising an ethylenic unsaturated sulfonic acid or its salt, as set forth in Japanese Patent Publication No. 51-31280.

The coarse powders (having a mean particle size of 5–15 μm) of the methacrylate ester base polymer, for instance, are obtainable by spray-drying an aqueous dispersion of the methacrylate ester base polymer's fine powders and pulverizing the powders into a given particle size, followed by drying.

Reference will now be made to blending the inorganic component-containing mixed emulsion into the composition for forming insulating films on electrical steel sheets.

This is achieved by the following two processes.
(i) The first process wherein the carboxylic acid component-containing polyer alone is used as the organic component.

The aqueous emulsion of the carboxylic acid component-containing polymer (A) is mixed with an aqueous solution of the inorganic component consisting mainly of a chromate at a ratio of 15–120 parts by weight of the nonvolatile matter of (A) (substantially the carboxylic acid component-containing polymer) with respect to 100 parts by weight—calculated as $CrO_3$—of the chromate content of the latter aqueous solution.
(ii) The second process wherein the methacrylate ester base polymer powders (B) are used together with the carboxylic acid component-containing component as the organic components.

That is, 10–90% by weight of (A) used in Process (i) is substituted by (B). In other words, (A) and (B) are mixed together such that (B) accounts for 10–90% by weight of the total amount of the nonvolatile matter content of (A) plus (B), thereby obtaining a mixed resin solution, which is in turn handled as is (A) in Process (i) is handled. To put it another way, the mixed resin solution is mixed with the aqueous solution of the inorganic component at a ratio of 15–120 parts by weight of the nonvolatile matter content of the former with respect to 100 parts by weight—calculated as $CrO_3$—of the chromate content of the latter aqueous solution (in what follows, the chromate content will be expressed as calculated simply as $CrO_3$). In this case, the methacrylate ester base polymer fine powders that are used alone to prepare the mixed solution may all have a mean particle size of 0.5 μm or below, as ealier stated. Alternatively, the methacrylate ester base polymer having a mean particle size of 5–15 μm may be used with said fine powders in an amount of 50–90% by weight of the total amount of the methacrylate ester base polymer.

When the methacrylate ester base polymer powders are used to prepare the mixed resin solution, in which all powders have a mean particle size of 0.5 μm or below, their aqueous dispersion may be mixed with the aqueous emulsion of the carboxylic acid component-containing polymer. When, in the part of methacrylate ester base polymer powders, are used the coarse and fine powders having mean particle sizes of 0.5 μm and 5–15 μm or below respectively, on the other hand, the coarse powders may first be added to and mixed with the aqueous dispersion of the fine powders at the given ratio. Alternatively, both the powders may separately be mixed with the aqueous emulsion of the carboxylic acid component-containing polymer.

Reference will now be made to how the ratio of the inorganic and organic components blended together has been determined.

At the outset of studies which underlies this invention, the inventors made investigation by using a carboxylic acid component-containing polymer alone as the organic component. As a result of extensive examinations of the ratios of an aqueous solution of the inorganic component consisting mainly of a chromate blended with an aqueous dispersion of the polymer, including a specific ratio (as will be described in one of the examples wherein the aqueous solution of the inorganic component has 15 g $CrO_3$ in 27 g solid matter content, and 5.58 g solid matter content in 11 g aqueous polymer emulsion) it was found that a proper blending ratio lies at 15–50% by weight, preferably 15–40% by weight in terms of the nonvolatile contents of both on the basis of the total solid matter content (since this term is equivalent in sense to the "nonvolatile matter content", the latter term will hereinafter be used). Further studies of using as the organic component a combination of the carboxylic acid component-containing polymer with the methacrylate ester base polymer powders revealed that the blending ratio of the organic component is more properly expressed in terms of the parts by weight of the nonvolatile matter content of the aqueous polymer emulsion with respect to 100 parts by weight of $CrO_3$, rather than with respect to the total nonvolatile matter content of the aqueous polymer emulsion and the aqueous solution of the inorganic component. According to this expression, a preferable nonvolatile matter content of the aqueous polymer emulsion with respect to 100 parts by weight of $CrO_3$ in the aqueous solution of the inorganic component is in the range of 32 to 120 parts by weight in the aforesaid example. Still further studies showed that even when the blending ratio of the aqueous polymer emulsion is in the range of 15–32 parts by weight with respect to 100 parts by weight of $CrO_3$, low-expandable insulating films excelling in such properties as water resistance, adhesion and stickiness can be obtained, as is the case with the range of 32–120 parts by weight.

Referring to a combination of the carboxylic acid component-containing polymer with the methacrylate ester base polymer powders used as the organic component, the blending ratio was determined by adding and mixing 20 g/l and 55 g/l—calculated as the resins (the nonvolatile matter or powder contents)—of the carboxylic acid component-containing aqueous polymer emulsion and the methacrylate ester base polymer powders to and with pH 5.7 aqueous solution of the inorganic components, i.e. 150 g/l of the main component $CrO_3$, 50 g/l of MgO, 50 g/l of $H_3BO_3$ and 30 g/l of glycerin, thereby preparing an insulating film-forming composition. In this case, in the methacrylate ester base polymer powders used, there are fine powders and coarse powders, the forms having a mean particle size of at most 0.5 μm or below and the latters of 5–15 μm. Each of the resulting compositions was coated on an electrical steel sheet, followed by drying (by heating at a temperature of 300°–500° C.), thereby forming a film, which was then measured in terms of its insulating performance, weldability, adhesion, etc. As a result, it was found that the resulting films were much more improved in terms of insulating performance than conventional ones. Furthermore, it was found that a film as thick as 3–6 g/m² shows improved weldability and low expandability at the step of coating, probably because the methacrylate ester base polymer is so excellent in heat resistance that it is less likely to soften than other resin; even when decomposed, it emits a limited amount of gases per unit weight so that the film is improved in its weldability; and it can prevent carburizing in the course of annealing. Especially when 5–90% by weight of the methacrylate ester base polymer powder had a coarse mean particle size and the rest had a fine mean particle size, the aforesaid effect was much more improved. This appears to be because the resulting film is so intensified by the coexistence of the coarse and fine powders that its insulating performance can be well maintained and a minute degree of roughness is so imparted onto the surface of the film that it can produce a sufficient space effect, combined with the limited volume of decomposing gases, thereby improving the weldability of the film considerably.

In the composition for forming insulating films on electrical steel sheets according to this invention, the aqueous solution or mixed resin solution of the carboxylic acid component-containing polymer obtained in such a way as mentioned above is used as the organic component. This solution is then mixed with the aqueous solution of the inorganic film-forming composition consisting mainly of a chromate at a ratio of 15–120 parts by weight of the nonvolatile matter content of the former, i.e. the aqueous polymer solution or mixed resin solution with respect to 100 parts by weight of the chromate content of the latter, calculated as $CrO_3$.

The method for forming insulating films on electrical steel sheets according to this invention involves coating the aforesaid composition on an electrical steel sheet and heating the resulting coating at a temperature of 300°–500° C. to form an insulating film in the range of a coverage of 0.4 to 6.0 g/m². By the application of this method, it is possible to increase the thickness of an insulating film from a high of 2.0 g/m²—achieved by the method disclosed in Japanese Patent Laid-Open No. 62-100561 referred to in the present disclosure as an improvement in this invention—to 6.0 g/m².

EXAMPLES AND COMPARATIVE EXAMPLES INCLUDING THE BEST MODE FOR EMBODYING THE INVENTION

The present invention will now be explained more illustratively with reference to the examples and comparative examples wherein, unless otherwise stated, the "parts by weight" is given by weight.

(I) USING THE CARBOXYLIC ACID COMPONENT-CONTAINING POLYMER ALONE AS THE ORGANIC COMPONENT (i) Preparation of the Aqueous Emulsion of the Carboxylic Acid Component-containing Polymers and its Properties Five hundred (500) parts of each of monomer blends, in which the respective monomers were blended together at the respective ratios of copolymerization mentioned in Table 1 Under Example Nos. 1–7 and Comparative Example Nos. 1–2 and 7–9, and a solution of 2.5 parts of ammonium persulfate in 70 parts of deionized water were concurrently fed under agitation into a polymerizer containing 420 parts of deionized water, 2 parts of acidic sodium sulfite and 0.009 parts of ferrous chloride over 2 hours. Subsequently, the polymerization reaction was carried out under full agitation at 50° C. for further two hours.

In Comparative Example 3, the aforesaid procedure was followed for polymerization with the exception that 2% by weight of sodium lauryl sulfate was added as an emulsifier per the total weight of the feed monomers. In Comparative Examples 4–6, the procedure of Comparative Example 3 was followed with the exception that defoamers were added after polymerization. As defoamers, Foster VL (trade name—made by Sannopuko K.K.) was added in an amount of 20 ppm in Comparative Example 4; Antifoam AFE (trade name—made by Toshiba Silicone K.K.) in an amount of 10 ppm in Comparative Example 5; and Antifoam AFE in an amount of 50 ppm in Comparative Example 6.

Various aqueous polymer emulsions obtained in this way were measured in terms of their MFT (°C.), expandability, mean particle sizes (μm) of polymer particles and freeze-thaw stability. The expandability of Comparative Examples 4-6, however, was measured just after the addition of the defoamers (A)—and after freeze-thaw (B). In Comparative Example 8 the properties of the composition could not be measured due to its coagulation. How to measure the above properties will hereinafter be summarized.

(ii) Preparation of Compositions for Forming Insulating Films on Electrical Steel Sheets and Method for Forming Insulating Films The foregoing various aqueous polymer emulsions were used as a blend solution for an aqueous solution of the inorganic components consisting mainly of a chromate to prepare various compositions for forming insulating films on electrical steel sheets (which may hereinafter be called the chromate base surface treating solutions) in the following manner.

Dissolved in 100 ml of deionized water were 15 g of chromic acid, 4 g of magnesium oxide, 5 g of boric acid and 3 g of glycerin, and 30 mg of a nonionic surface active agent (available in the trade name of Surfynol SE and made by Nisshin Kagaku Kogyo K.K.) were added to the solution. Subsequently, 11 g of the aqueous polymer emulsions (having a nonvolatile matter content of 5.58 g) were added to and mixed with the solution to prepare a chromate base surface treating solution for forming insulating films (in this case, the nonvolatile matter content of the aqueous polymer emulsion was 37.2 parts per 100 parts of $CrO_3$). The dispersion stability of the treating solution was then measured.

Then, the surface treating solution was roll-coated on an electrical steel sheet to a thickness of 1 μm and thereafter dried at an ambient temperature of 350° C. for 1.5 minutes. The water resistance, adhesion and low-stickness of the film formed in this way were measured. In Comparative Examples 1-7 and 9, the obtained surface treating solutions were of severe expandability, and tests were not performed. Tests were somehow performed in Comparative Examples 1 and 7, but not in Comparative Examples 2-6 and 9.

How to measure the properties of the aqueous polymer solutions, surface treating surfaces and films will be given just below.

(a) MFT in (°C.):

A thin layer of each sample was cast on an aluminium sheet having a temperature graduation, followed by drying. The MFT of the sample was determined by measuring the temperature of the border between the transparent continuous film region and the white powder region.

(b) Expandability of aqueous polymer emulsions

This has already been explained.

(c) Mean particle sizes of polymer particles

Readings (unit in μm) of particle sizes from photographs taken with a scanning type of electron microscope of 20,000 magnifications (H-800 Model manufactured by Hitachi, Ltd.).

(d) Freeze-thaw stability

Ten (10) ml of each sample were placed in a test tube and subjected to five freeze-thaw cycles. Then, the dispersion of the emulsion was visually observed.

(e) Dispersion stability

Each liquid sample was stationarily prepared at room temperature (20°–30° C.) and thereafter left for 20 days. Then, the presence or absence of coagulation was visually determined.

(f) Water resistance

Each coated sample piece (having a thickness of 1 μm and measuring 50 mm × 50 mm) was dipped in boiling water for 1 hour. The water resistance of the sample was then determined by measuring the amount of Cr (μg) eluting in the water.

(g) Adhesion

Each coated sample piece was wound around a round rod of 5 mm in radius, and the film was then released from it under an observation with a loupe of 10 magnifications.

o: No peeling took place.

x: Peeling took place.

(h) Low stickiness

For this purpose, each coated sample was subjected to tacky-dry testing.

o: Tackiness x: Tackiness-free (III) The results are reported in Table 1.

TABLE 1

| Example No. Comparative Example No. | Ratio of copolymerization of monomers (wt. %) | | | | Properties of aqueous polymer emulsion | | | |
|---|---|---|---|---|---|---|---|---|
| | Methyl methacrylate | Butyl acrylate | Ethylenic unsaturated carboxylic acid Note 1) | Vinylic compound Note 1) | MFT (°C.) | Expandability (ml) | Expandability after defoamer addition (ml) Note 2) | |
| | | | | | | | A | B |
| Examples | | | | | | | | |
| 1 | 41 | 35 | MAA 4 | ST 20 | 50 | 8 | — | — |
| 2 | 39 | 35 | MAA 6 | ST 20 | 50 | 6 | — | — |
| 3 | 40 | 35 | MAA 5 | ST 20 | 50 | 7 | — | — |
| 4 | 50 | 25 | MAA 5 | ST 20 | 62 | 7 | — | — |
| 5 | 45 | 35 | MAA 4 AA 1 | ST 20 | 50 | 6 | — | — |
| 6 | 43 | 35 | MAA 5 | ST 15 N-MAM 2 | 50 | 8 | — | — |
| 7 | 41 | 35 | MAA 5 | ST 15 AAm 4 | 50 | 8 | — | — |
| Comparative Examples | | | | | | | | |
| 1 | 43 | 35 | MAA 2 | ST 20 | 50 | 50 | — | — |
| 2 | 37 | 35 | MAA 8 | ST 20 | 50 | 38 | — | — |
| 3 | 43 | 35 | MAA 2 | ST 20 | 50 | 72 | — | — |
| 4 | 43 | 35 | MAA 2 | ST 20 | 50 | — | 1 | 70 |

TABLE 1-continued

| | | | | | | | | | | |
|---|---|---|---|---|---|---|---|---|---|---|
| 5 | 43 | 35 | MAA 2 | | ST 20 | 50 | — | | 10 | 40 |
| 6 | 43 | 35 | MAA 2 | | ST 20 | 50 | — | | 0 | 40 |
| 7 | 5 | 90 | MAA 5 | | ST 0 | <10 | 35 | | — | — |
| 8 | 70 | 5 | MAA 5 | | ST 20 | 92 | Coagulated on poly- merization | | — | — |
| 9 | 5 | 75 | MAA 5 | | ST 15 | <10 | 33 | | — | — |

| Example No. Comparative Example No. | Mean particle size of polymer particles ($\mu$m) | Freeze- thaw stability | Dispersion stability of sur- face treating solutions for foaming insulating films | Insulating film properties | | |
|---|---|---|---|---|---|---|
| | | | | Water resistance | Adhesion | Stickness |
| Examples | | | | | | |
| 1 | 0.3 | No change | No change | 200 $\mu$g or less | o | o |
| 2 | 0.2 | No change | No change | 200 $\mu$g or less | o | o |
| 3 | 0.2 | No change | No change | 200 $\mu$g or less | o | o |
| 4 | 0.2 | No change | No change | 200 $\mu$g or less | o | o |
| 5 | 0.2 | No change | No change | 200 $\mu$g or less | o | o |
| 6 | 0.3 | No change | No change | 200 $\mu$g or less | o | o |
| 7 | 0.3 | No change | No change | 200 $\mu$g or less | o | o |
| Comparative Examples | | | | | | |
| 1 | 0.4 | Coagulation | Coagulation | 200 $\mu$g or less | o | o |
| 2 | 0.3 | No change | No change | — | — | — |
| 3 | 0.3 | No change | No change | — | — | — |
| 4 | 0.3 | No change | No change | — | — | — |
| 5 | 0.3 | Coagulation | No change | — | — | — |
| 6 | 0.3 | Coagulation | No change | — | — | — |
| 7 | 0.3 | No change | No change | 1200 $\mu$g | o | x |
| 8 | — | — | — | — | — | — |
| 9 | 0.3 | No change | — | — | — | — |

Note 1) MAA: methacrylic acid, AA: acrylic acid, ST: styrene, N-MAM: N-methylolacrylamide, AAm: acrylamide
Note 2) A: Expandability just after defoamer addition, B: Epandability after freeze-thaw cycle following defoamer addition From Table 1, it is found that the aqueous polymer solutions used in Examples 1–7, i.e. meeting the conditions defined in this invention are of low expandability and excel in such properties as freeze-thaw stability. The chromate base surface treating solutions obtained by blending the polymer solutions with the aqueous solution of the inorganic component containing a chromate as the main component are improved in terms of dispersion stability, and can provide films having improved properties.

By contrast, the aqueous polymer emulsions used in Comparative Examples 1–3 are of serious expandability, since they are either short of or rich in the amount of the methacrylic acid as the ethylenic unsaturated carboxylic acid component. In Comparative Example 1, both the freeze-thaw stability of the emulsion and the dispersion stability of the surface treating solution were so inferior that it coagulated.

The defoamer-containing comparative emulsions 4–6 showed low expandability just after the addition of the defoamers but, it was noted that once frozen, the emulsion lost the defoaming effect completely.

The aqueous polymer emulsions used in Comparative Examples 7–9 were intentionally made to have their MFT departed from the defined range by adjusting the proportion of alkyl methacrylate and alkyl acrylic acid in the polymer component. It is noted that the polymers of such aqueous emulsions as being out of the range of the present invention coagulate at the time of polymerization. It is also noted that the emulsions show increased expandability and the surface treating solutions obtained from them provide sticky films.

(II) USING A COMBINATION OF THE CARBOXYLIC ACID COMPONENT-CONTAINING POLYMER WITH THE METHACRYLATE ESTER BASE POLYMER POWDERS AS THE ORGANIC COMPONENT

(1) Preparation and Properties of the Aqueous Emulsion of of the Carboxylic Acid Component-containing Polymer The procedure in Example 1 was followed with the exception that monomer blends were prepared from the monomers mentioned in Table 2 at the specified ratios of copolymerization without and with various amounts of an expandability-regulating nonionic surface active agent. The properties of the obtained aqueous emulsions of the carboxylic acid component-containing polymers are reported in Table 2.

TABLE 2

| | Rate of co- polymerization (weight %) | | | | Emulsion properties | | | Matters out of present invention |
|---|---|---|---|---|---|---|---|---|
| | | | | | Mean particle size | MFT | Expand- ability | |
| No. | MMA | BA | ST | MAA | ($\mu$m) | (°C.) | (ml) | |
| A-1 | 40 | 35 | 20 | 5 | 0.2 | 50 | 7 | None |
| A-2 | 43 | 35 | 20 | 2 | 0.4 | 50 | 50 | Rate of MAA polymerization Foamability |
| A-3 | 37 | 35 | 20 | 8 | 0.3 | 50 | 38 | Rate of MAA polymerization |

TABLE 2-continued

| | Rate of co-polymerization (weight %) | | | | Emulsion properties | | | |
|---|---|---|---|---|---|---|---|---|
| | | | | | Mean particle size | MFT | Expand-ability | Matters out of present |
| No. | MMA | BA | ST | MAA | (μm) | (°C.) | (ml) | invention |
| A-4 | 5 | 75 | 15 | 5 | — | <10 | 18 | MFT |
| A-5 | 70 | 5 | 20 | 5 | — | 92 | Coalugated when polymerized | MFT, coagulation |

Note:
MMA: Methyl Methacrylate
BA: Butyl Acrylate
ST: Styrene
MAA: Methacrylate (2) Preparation and Properties of the Aqueous Dispersions of the Methacrylate Ester Base Polymer's Fine Powders In each run, 30 parts of the monomers mentioned in Table 3 were fed into a polymerizer containing 1.5 parts of a water-soluble polymer comprising MMA/sodium p-styrene sulfonate (70/30) in 65 parts of deionized water and 0.0005 parts of $FeCl_2$, followed by the initiation of stirring. Two solutions of 0.3 parts of ammonium persulfate in 2.5 parts of deionized water and 0.3 part of acidic sodium sulfite in 2.5 parts of deionized water were concurrently added dropwise to the solution stirred for 1 hour, subsequently followed by a 2-hour polymerization reaction under agitation at 70° C. This yielded an aqueous dispersion of fine powders of the methacrylate ester base polymer, the properties of which are reported in Table 3.

TABLE 3

| | Rate of co-polymerization (weight %) | | | Mean particle size | MFT | Matters out of present |
|---|---|---|---|---|---|---|
| No. | MMA | BA | EG | (μm) | (°C.) | invention |
| M-1 | 100 | 0 | 0 | 0.2 | 110 | None |
| M-2 | 97 | 0 | 3 | 0.5 | 130 | None |
| M-3 | 80 | 17 | 3 | 0.3 | 70 | MFT |

Note: EG: Ethylene glycol dimethacrylate (3) Preparation and Properties of the Methacrylate Ester Base Polymer's Fine Powders Each of the aqueous polymer emulsions mentioned in Table 3 was sprayed through a two-flow nozzle for drying at a hot air temperature of 200° C., thereby obtaining coarse powders of the methacrylate ester base polymer, the mean particle size of which is reported in Table 4.

TABLE 4

| No. | Aqueous dispersion used | Mean particle size (μm) | Matters out of present invention |
|---|---|---|---|
| MC-1 | M-1 | 8 | None |
| MC-2 | M-2 | 13 | None |
| MC-3 | M-3 | 10 | None |

(4) Preparation of Compositions for Forming Insulating Films, Formation of Insulating Films and Estimation of Them Using as three organic component materials (1) the aqueous emulsion of the carboxylic acid component-containing polymer, (2) the aqueous dispersion of the fine powders of the acrylate ester base polymer and (3) the coarse powders of the acrylate ester base polymer, compositions for forming insulating films on electrical steel sheets were prepared in the following manner.

That is, the three organic component materials were first mixed together to obtain mixed resin solutions having their composition shown in Table 5. Then, 15 g of chromic acid, 4 g of magnesium oxide, 5 g of boric acid and 3 g of glycerin were dissolved with 30 mg of a nonionic surface active agent (Trade name: Surfynol SE made by Nisshin Kagaku Kogyo K.K.) in 100 ml of deionized water to obtain an aqueous solution of the inorganic components. This aqueous solution was mixed with the above-mentioned mixed resin solutions to prepare various compositions for forming insulating films.

The abbreviations used for the respective organic components referred to in the Table 5 indicate the following materials.
CE: carboxylic acid component-containing polymer.
ME-F: fine powders of the methacrylate ester base polymer.
ME-C: coarse powders of the methacrylate ester base polymer.

The concentrations of the organic components in the mixed resin solutions are indicated by CE, ME-F and ME-C, respectively.

In addition to the above-mentioned 3 organic components used, an acrylonitrile base resin was used in Comparative Examples 10 and 11 in place of the whole or a part of the methacrylate ester base polymer. In Table 5, PAN-F refers to a water dispersion of polyacrylonitrile (Trade name: Taftic F-120 made by Nippon Exlan Kogyo K.K.) and PAN-P refers to coarse powders (having a particle size of 5-15 μm) obtained by the spray drying of Taftic F-120 through a two-flow nozzle at a hot air temperature of 200° C.

The respective film-forming compositions prepared as mentioned above were first measured in terms of their expandability.

Subsequently, they were coated on an electrical steel sheet by means of a roll coater and then heated and dried at an ambient temperature of 350° C. for 2 minutes in a hot-air dryer type of oven to form insulating films. The amounts of the films were regulated through roller pressures, the concentrations of the film-forming compositions, etc. The coatability of the compositions were observed and the amounts of the resulting films were measured. In addition, examinations were made of such properties as adhesion, corrosion resistance, chrome elution, interlaminar resistance, punchability and weldability. The respective properties were measured and estimated in the following manners.
(i) Expandability of film-forming compositions In each run, 100 cc of a sample were shaken in a graduate cylinder (250 cc) with a lid and then permitted to stand to measure the heights of the resulting bubbles.
 ⊚ : below 10 cc in terms of the amount of expansion
 o: 10 cc to below 50 cc in terms of the amount of expansion
 Δ: 50 cc to below 100 cc in terms of the amount of expansion
 x: 100 cc or more in terms of the amount of expansion
(j) Coatability
In each run, a sample was roll-coated on an electrical steel sheet at a line speed of 30–150 m/min. and its appearance of the resulting finish coat was visually estimated.
 o: Satisfactory finish coat was obtained.
 Δ: Some expansion defects and striations due to resin powders of larger size were found.
 x: Serious expansion defects and striations due to resin powders of larger size were found.
(k) Film amount
In each run, the amount of a film sample dried and baked to an electrical steel sheet piece (hereinafter referred to as a test piece) was measured by dipping it in a 50% aqueous solution of NaOH for its dissolution and by fluorescent X-rays.
(l) Adhesion
In each run, a test piece was wound around a round rod of 5 mm in radius and then peeled off under a loupe of 10 magnifications.
 o: No peeling occurred.
 Δ: Some peeling occurred.
 x: Serious peeling occurred.
(m) Corrosion resistance
In each run, a saline solution was sprayed over a test piece for 7 hours according to JIS Z2371, and estimation was then made of how widely red rust occurred over the test piece.
 ⊚ : No red rust was found.
 o: Red rust was found over less than 5% of area.
 Δ: Red rust was found over 5% to below 10% of area.
 x: Red rust was found over more than 10% of area.
(p) Chrome elution
In each run, a test piece was dipped in boiling water for 2 hours, and the amount of Cr eluting in the water was then measured by atomic-absorption spectroscopy.
(q) Interlaminar resistance
This was measured according to JIS C2550.
(r) Punchability
In each run, a sample was repeatedly punched out under the following conditions to find the maximum punching cycles at which its height of warpage was 50 μm or lower.
 Stroke: 500 strokes/min.
 Mold material: SKD-11.
 Punching diameter: 5 mm.
 Punching oil: Light oil.
 Pressing machine: Fast automatic press made by Mitsui Seiki K.K.
(s) Weldability
After TIG welding was carried out under the following conditions, estimation was made of how many blow-holes occurred.
 Welding current: 120 A.
 Electrode diameter: 2.4 mm.
 Core pressure: 50 kg/cm$^2$.
 Welding speed: 100 cm/min.
 Welding machine: TIG welding machine made by Osaka Henatsuki K.K.
 o: No blow-hole was found.
 Δ: A few blow-holes were found.
 x: Many blow-holes were found.
(t) Carburizing
In each run, annealing was carried out at 815° C. for hour in a gaseous mixture of 5% H$_2$—95% N$_2$, and the amount of C in a steel sample before and after annealing was chemically analyzed.
 o: The amount of C did not vary between before and after annealing—no carburizing occurred.
 x: The amount of C increased after annealing—carburizing occurred.

The results are reported in Tables 5 and 6.

TABLE 5

| | Mixed materials for organic component | | | Composition of mixed resin solution (wt. %) | | | | Film-forming composition Note 3) Total resin amount (Parts by weight) | Expand-ability | Coat-ability | Film amount (g/m$^2$) |
|---|---|---|---|---|---|---|---|---|---|---|---|
| | For CE | For ME-F | For ME-C | <CE> | <ME-F> | <ME-C> Note 1) | Note 2) ME | | | | |
| Examples | | | | | | | | | | | |
| 8 | A-1 | M-1 | — | 3 | 7 | 0 (0) | 70 | 50 | ⊚ | O | 0.5 |
| 9 | A-1 | M-1 | MC-1 | 3 | 2 | 5 (71) | 70 | 50 | ⊚ | O | 2.0 |
| 10 | A-1 | M-2 | MC-2 | 3 | 5 | 2 (29) | 70 | 50 | ⊚ | O | 2.0 |
| 11 | A-1 | M-2 | MC-2 | 5 | 3 | 2 (40) | 50 | 50 | ⊚ | O | 2.0 |
| 12 | A-1 | M-2 | MC-2 | 8 | 1 | 1 (50) | 20 | 70 | ⊚ | O | 3.0 |
| 13 | A-1 | M-2 | MC-2 | 2 | 4 | 4 (50) | 80 | 30 | ⊚ | O | 4.0 |
| 14 | A-1 | M-2 | MC-2 | 5 | 3 | 2 (40) | 50 | 100 | ⊚ | O | 3.0 |
| 15 | A-1 | M-2 | MC-2 | 5 | 3 | 2 (40) | 50 | 15 | ⊚ | O | 6.0 |
| 16 | A-1 | M-2 | MC-2 | 5 | 3 | 2 (40) | 50 | 120 | ⊚ | O | 2.0 |
| Comparative Examples | | | | | | | | | | | |
| 10 | A-1 | — | — | 1 | 0 | 0 (0) | 0 | 5 | ⊚ | X | 2.0 |
| 11 | A-1 | M-3 | — | 3 | 2 | 5 (71) | 70 | 70 | O | Δ | 2.0 |
| 12 | A-1 | M-3 | MC-3 | 3 | 2 | 5 (71) | 70 | 70 | O | Δ | 2.0 |
| 13 | — | M-1 | MC-1 | 0 | 5 | 5 (50) | 100 | 70 | O | X | 2.0 |
| 14 | A-1 | M-2 | MC-2 | 3 | 2 | 5 (40) | 50 | 5 | ⊚ | X | 2.0 |
| 15 | A-1 | M-2 | MC-2 | 3 | 2 | 5 (40) | 70 | 130 | ⊚ | O | 2.0 |
| 16 | A-2 | M-1 | — | 3 | 7 | 0 (0) | 70 | 50 | X | X | 0.5 |
| 17 | A-3 | M-1 | — | 3 | 7 | 0 (0) | 70 | 50 | O | O | 0.5 |
| 18 | A-4 | M-1 | — | 3 | 7 | 0 (0) | 70 | 50 | Δ | Δ | 0.5 |
| 19 | A-1 | PAN-F | PAN-P | 3 | 2 | 5 — | — | 70 | ⊚ | O | 2.0 |

TABLE 5-continued

| | Mixed materials for organic component | | | Composition of mixed resin solution (wt. %) | | | | Film-forming composition | | | Film amount (g/m²) |
|---|---|---|---|---|---|---|---|---|---|---|---|
| | For CE | For ME-F | For ME-C | <CE> | <ME-F> | <ME-C> Note 1) | Note 2) ME | Note 3) Total resin amount (Parts by weight) | Expand-ability | Coat-ability | |
| 20 | A-1 | PAN-F | MC-1 | 3 | 2 | 5 — | — | 70 | ⊚ | ○ | 2.0 |

Note 1) Weight % of ME-C to total amount of ME
Note 2) Weight % of ME (total amount of MC-F and MC-C) to total amount of resins
Note 3) Number of perts by weight to 100 parts by weight calculated as CrO₃

TABLE 6

| | Adhesion | Corrosion resistance | Chrome elution (μg/m²) | Interlaminar resistance (Ω · cm²/sheet) | Continuous punchability (×10⁴ times) | Weld-ability | Carburiz-ing |
|---|---|---|---|---|---|---|---|
| Examples | | | | | | | |
| 8 | ○ | ○ | 200 or less | 100 | 100~150 | ○ | ○ |
| 9 | ○ | ⊚ | 200 or less | 200 or more | 150~200 | ○ | ○ |
| 10 | ○ | ⊚ | 200 or less | 200 or more | 150~200 | ○ | ○ |
| 11 | ○ | ⊚ | 200 or less | 200 or more | 150~200 | ○ | ○ |
| 12 | ○ | ⊚ | 200 or less | 200 or more | 150~200 | ○ | ○ |
| 13 | ○ | ⊚ | 200 or less | 200 or more | 150~200 | ○ | ○ |
| 14 | ○ | ⊚ | 200 or less | 200 or more | 150~200 | ○ | ○ |
| 15 | ○ | ⊚ | 200 or less | 200 or more | 100~150 | ○ | ○ |
| 16 | ○ | ⊚ | 200 or less | 200 or more | 200 or more | Δ | ○ |
| Comparative Examples | | | | | | | |
| 10 | X | X | 1200 | 75 | 150~200 | X | ○ |
| 11 | Δ | Δ | 300~500 | 90 | 150~200 | X | ○ |
| 12 | Δ | Δ | 300~500 | 100 | 150~200 | Δ | ○ |
| 13 | X | X | 1400 | 100~150 | 50 or less | ○ | ○ |
| 14 | Δ | ○ | 200 or less | 100~150 | 50 or less | ○ | ○ |
| 15 | ⊚ | ⊚ | 200 or less | 100~150 | 200 or more | X | ○ |
| 16 | Δ | X | 1300 | 85 | 150~200 | ○ | ○ |
| 17 | Δ | X | 1400 | 75 | 150~200 | X | ○ |
| 18 | ○ | X | 1200 | 70 | 100~150 | X | ○ |
| 19 | ⊚ | ⊚ | 200 or less | 200 or more | 100~150 | Δ | X |
| 20 | ⊚ | ⊚ | 200 or less | 100~150 | 100~150 | Δ | X |

From Tables 5 and 6, it is found that the compositions for electrical steel sheets according to Examples 8-16, i.e. meeting the conditions defined in this invention and the insulating films obtained therefrom are all superior in various properties. By contrast, the comparative composition 10—which is not only free from the methacrylate ester base polymer powders but the organic components are also insufficient as a whole—and the comparative compositions 11 and 12—in which the MFT of the methacrylate ester polymer's fine powders departs from the inventive range—are all found to be poor in coatability and provide films whose properties, e.g. adhesion and corrosion resistance, deteriorate seriously.

The comparative composition 13—which is free from the aqueous emulsion of the carboxylic acid component-containing polymer—is inferior in terms of both film-forming properties and coatability and fails to provide a film whose properties, e.g. adhesion and corrosion resistance, are poorer.

The comparative composition 14—in which the resin component is insufficient—is found to be poor in continuous punchability, and the comparative composition 15—in which the resin component in excess—is found to be seriously lacking in weldability.

The comparative compositions 16 and 17—in which the fine and coarse powders of the polyacrylonitrile base resin (PAN) are used in place of the methacrylate ester base powders—are found to provide films which are carburized after deformation-removing annealing following coating and punching, thus giving rise to a serious degradation of the electrical properties of the steel sheets.

From the results of the foregoing examples and comparative examples, it is understood that the instant compositions for forming insulating films on electrical steel sheets obtained by using as the organic component a combination of the carboxylic acid component-containing polymer with the methacrylate ester base polymer powders have excellent properties. It is also noted from the foregoing examples that the instant film-forming compositions are much more improved in storage stability.

Industrial Applicability

The present invention provides a composition for forming insulating films, in which an aqueous solution of an inorganic substance for forming insulating films is mixed with an organic component material made of an aqueous emulsion of a carboxylic acid component-containing polymer, or a combination of said aqueous emulsion with fine powders of a methacrylate ester base polymer, which may be partly substituted by coarse powders of said methacrylate ester base polymer. This composition is much more improved in low expandability, coatability and storage stability and provides a film whose properties, e.g. water resistance, adhesion, punchability, corrosion resistance and insulating performance, are all improved.

Especially when the fine and coarse powders of the methacrylate ester base polymer are permitted to coexist in the insulating film-forming composition according to this invention, an intense and fine degree of roughness is imparted to the surface of the resulting film. This fine degree of roughness produces a sufficient space effect and so makes a contribution to an improvement in insulating performance, because the methacrylate ester base polymer is so excellent in heat resistance that it is less likely to soften than other resins. A synergistic combination of this space effect with the feature of the methacrylate ester base polymer whose decomposing gases are more limited in volume than those of other resins gives rise to a further improvement in weldability and serves well to prevent the film from being carburized during deformation-removing annealing.

Taken altogether, the composition according to this invention can not only satisfy the requirements recently imposed on insulating films but also be well fit for fields for which specific film properties, e.g. high weldability and insulating performance, are required.

What is claimed is

1. A composition for forming insulating films on electrical steel sheets comprising an aqueous emulsion of a carboxylic acid component-containing polymer (A) which is stably dispersed in an aqueous medium, and having a minimum filming temperature of 40°–70° C. and an expandability of 10 ml or less, said carboxylic acid component-containing polymer comprising 56–97% by weight of at least one ester selected from alkyl methacrylate esters and alkyl acrylate esters, 3–7% by weight of an ethylenic unsaturated carboxylic acid and 0–37% by weight of a vinylic compound other than said alkyl methacrylate ester, alkyl acrylate ester and ethylenic unsaturated carboxylic acid, and having a mean particle size of 0.5 $\mu$m or less, said aqueous emulsion (A) of a carboxylic acid component-containing polymer being mixed with an aqueous solution of a film-forming inorganic substance containing a chromate as a main component at a ratio of 15–120 parts by weight of a nonvolatile matter content of said aqueous emulsion per 100 parts by weight of the chromate content in said aqueous solution, calculated as $CrO_3$.

2. A composition as claimed in claim 1, wherein the alkyl methacrylate ester component of said carboxylic acid component-containing polymer is methyl methacrylate and the alkyl acrylate ester component thereof is butyl acrylate, respectively, and wherein the weight ratio of the former to the latter lies in the range of 1:0.2–0.9.

3. A composition as recited in claim 1, wherein 10–30% by weight of at least an aromatic vinylic compound is contained as the vinylic compound component of said carboxylic acid component-containing polymer.

4. A composition for forming insulating films on electrical steel sheets comprising:

an aqueous emulsion of a carboxylic acid component-containing polymer (A) which is s/ably dispersed in an aqueous medium, and having a minimum filming temperature of 40°–70° C. and an expandability of at most 10 ml, said carboxylic acid component-containing polymer comprising 56–97 by weight of an alkyl methacrylate ester component and/or an alkyl acrylate ester, 3–7% by weight of an ethylenic unsaturated carboxylic acid component and 0–37% by weight of a vinylic compound other than said alkyl methacrylate ester, alkyl acrylate ester and ethylenic unsaturated carboxylic acid, and having a mean particle size of at most 0.5 $\mu$m or less, and powders of a methacrylate ester base polymer (B), which can be formed into a film at a minimum filming temperature of 80° C. or higher, said aqueous emulsion of a carboxylic acid component-containing polymer (A) being mixed with said powders of a methacrylate ester base polymer (B) at a ratio of 10–90% by weight of said powders (B) based on the total weight of a nonvolatile matter content of said emulsion (A) and said powders (B) to obtain a mixed resin solution, which is then mixed with an aqueous solution of a film-forming inorganic material containing a chromate as a main component at a ratio of 15–120 parts by weight of the nonvolatile matter content of said mixed resin solution per 100 parts by weight of the chromate content of said aqueous solution, calculated as $CrO_3$.

5. A composition for forming insulating films on electrical steel sheets as recited in claim 4, wherein 5–90% by weight of said powders of methacrylate ester base polymer (B) comprises coarse particle powders having a mean particle size of 5–15 $\mu$m.

6. A composition as claimed in claim 4, wherein the alkyl methacrylate ester component of said carboxylic acid component-containing polymer is methyl methacrylate and the alkyl acrylate ester component thereof is butyl acrylate, respectively, and wherein the weight ratio of the former to the latter lies in the range of 1:0.2–0.9.

7. A composition as recited in claim 4, wherein 10–30% by weight of at least an aromatic vinylic compound is contained as the vinylic compound component of said carboxylic acid component-containing polymer.

8. A method for forming insulating films on electrical steel sheets, characterized in that said composition for forming insulating films on electrical steel sheets according to claim 4 is coated on an electrical steel sheet and heated in a temperature of 300°–500° C. to form an insulating film in the range of 0.4–6.0 g/m$^2$.

* * * * *